(12) United States Patent
Coons et al.

(10) Patent No.: US 7,271,935 B2
(45) Date of Patent: Sep. 18, 2007

(54) SELF-CALIBRATING PRINTER AND PRINTER CALIBRATION METHOD

(75) Inventors: David E. Coons, Webster, NY (US); Stuart G. Evans, Rochester, NY (US); Michael L. Moore, Brockport, NY (US); Charles S. Christ, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/352,056

(22) Filed: Feb. 10, 2006

(65) Prior Publication Data

US 2006/0126137 A1    Jun. 15, 2006
US 2007/0146829 A9    Jun. 28, 2007

(51) Int. Cl.
*B41B 15/00* (2006.01)
*G06F 15/00* (2006.01)

(52) U.S. Cl. .................... 358/2.1; 358/2.1; 358/1.9
(58) Field of Classification Search ............. 358/2.1, 358/1.9, 1.6, 518, 523; 382/162; 399/39, 399/49; 356/402, 300; 702/196, 27; 400/120.04
See application file for complete search history.

(56) References Cited

U.S. PATENT DOCUMENTS

| | | | |
|---|---|---|---|
| 4,700,238 A | 10/1987 | Sugiyama | |
| 4,775,877 A | 10/1988 | Kosugi et al. | |
| 4,809,080 A | 2/1989 | Kotani et al. | |
| 4,839,741 A | 6/1989 | Wilson | |
| 5,047,870 A | 9/1991 | Filo | |
| 5,049,999 A | 9/1991 | Stemmle | |
| 5,053,866 A | 10/1991 | Johnson | |
| 5,070,410 A | 12/1991 | Hadley | |
| 5,162,916 A | 11/1992 | Stemmle et al. | |
| 5,267,056 A | 11/1993 | Stemmle | |
| 5,491,568 A | 2/1996 | Wan | |
| 5,532,825 A | 7/1996 | Lim et al. | |
| 5,625,378 A | 4/1997 | Wan et al. | |
| 5,682,253 A | 10/1997 | Sakamoto et al. | |
| 5,760,799 A | 6/1998 | Inui et al. | |
| 5,812,172 A | 9/1998 | Yamada | |

(Continued)

FOREIGN PATENT DOCUMENTS

| | | |
|---|---|---|
| DE | 199 22 718 A1 | 12/1999 |
| EP | 0 680 198 A | 11/1995 |
| EP | 1 103 799 A | 5/2001 |
| GB | 2 339 103 | 12/2000 |

*Primary Examiner*—King Y. Poon
*Assistant Examiner*—Saeid Ebrahimi

(57) ABSTRACT

Printers and methods for operating a printer are provided. One method comprises receiving a print order associated with image data for use in printing a plurality images; converting the image data into actions to print the plurality of images on a receiver medium with print adjacent areas between the printed images, the converting being performed in accordance with printer settings; printing a first set of color patches in the print adjacent areas when the each of the first set of calibration color patches can be printed in the print adjacent areas; printing a second set of color patches in the print adjacent areas when each of the first set of color patches cannot be printed in the print adjacent areas; and sensing the color of each printed color patch and recalibrating the printer settings based upon the sensed colors.

14 Claims, 15 Drawing Sheets

U.S. PATENT DOCUMENTS

| | | |
|---|---|---|
| 5,926,283 A | 7/1999 | Hopkins |
| 6,086,274 A | 7/2000 | Krzyminski |
| 6,163,389 A | 12/2000 | Buhr et al. |
| 6,366,306 B1 | 4/2002 | Fukuda |
| 6,404,511 B1 | 6/2002 | Lin et al. |
| 2003/0164955 A1* | 9/2003 | Vinas et al. ................ 358/1.2 |
| 2004/0085378 A1 | 5/2004 | Sievert et al. |
| 2006/0066882 A1* | 3/2006 | Yamauchi et al. ........... 358/1.9 |

* cited by examiner

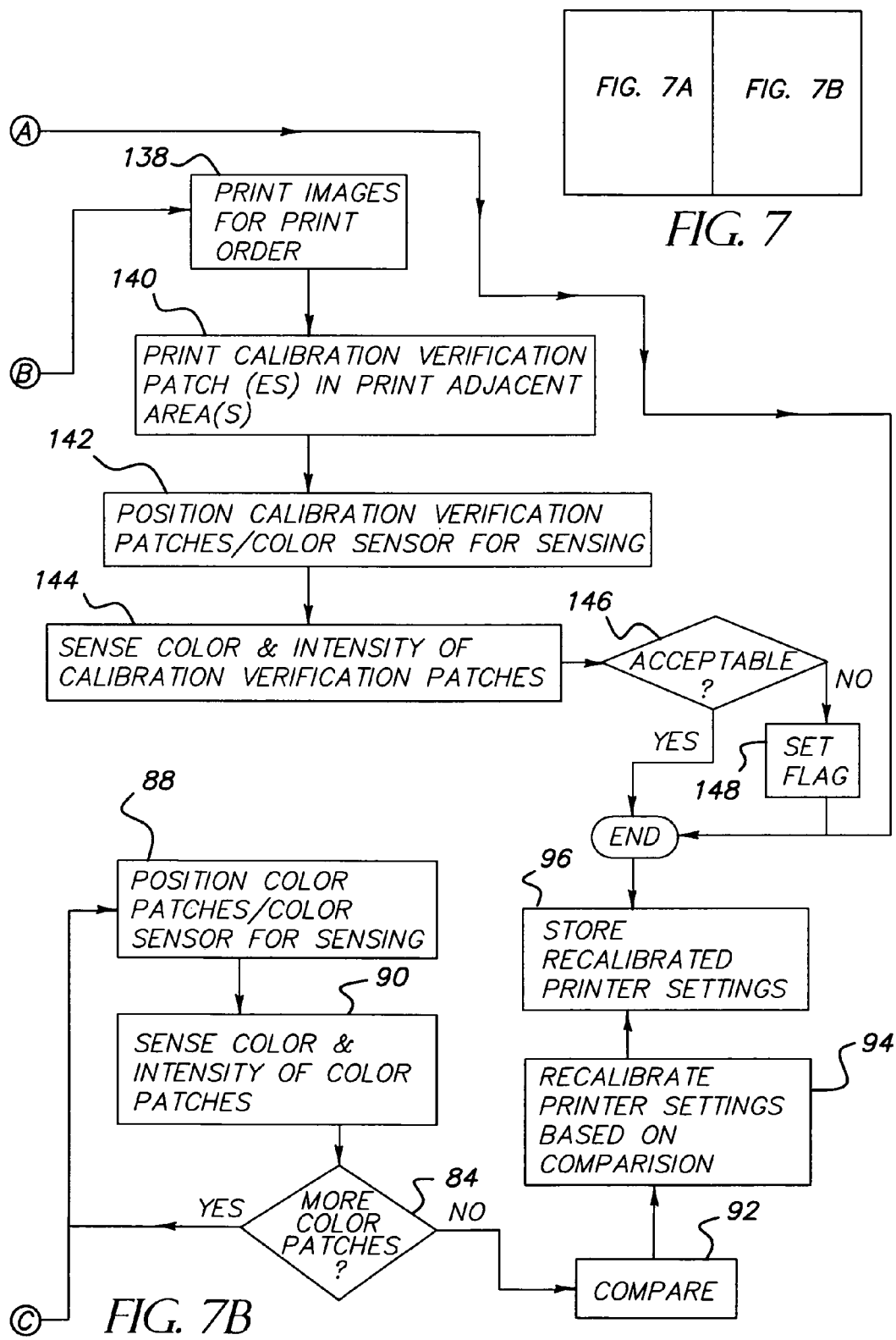

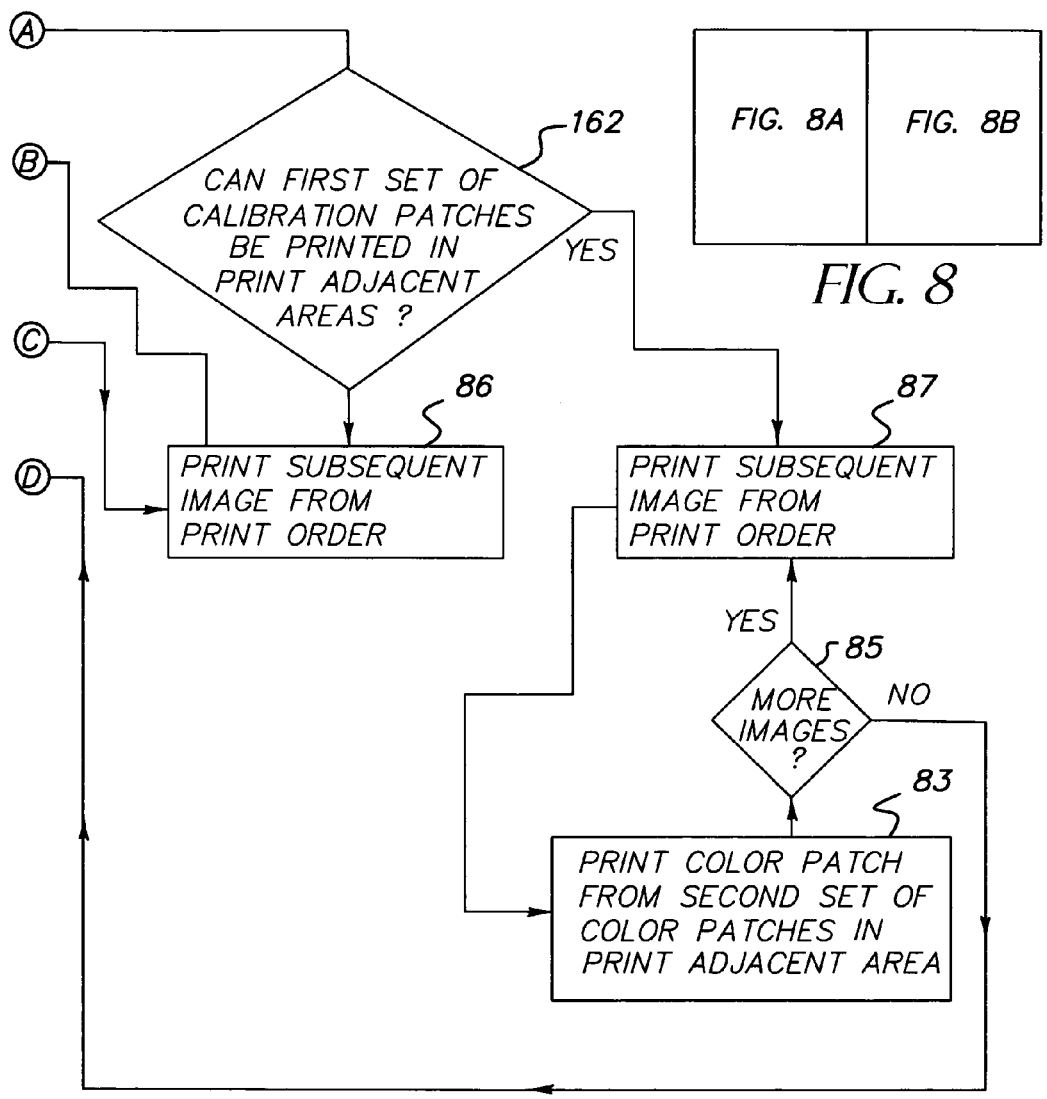

SELF-CALIBRATING PRINTER AND PRINTER CALIBRATION METHOD

CROSS-REFERENCE TO RELATED APPLICATIONS

Reference is made to commonly assigned, co-pending patent application U.S. Ser. No. 09/736,049, entitled PROOFING HEAD AND PROOFER PRINTER APPARATUS, filed Dec. 13, 2000 in the names of Collette et al.

FIELD OF THE INVENTION

The present invention relates to color printers.

BACKGROUND OF THE INVENTION

Digital color printers print images based upon digital image data. This digital image data includes code values indicating the colors to be printed in an image. When a digital color printer generates a printed image, it is intended that the printed image will contain the exact colors called for by the code values.

However, in practice, it has been found that the colors in the images printed by digital color printers do not always match the colors called for by the code values. Such color variations can be caused by differences in the composition or fabrication of donor materials such as inks, thermal donor, or toner, by differences in the composition of receiver materials, such as paper, fabrics, film, or other substrates, by variations in the assembly or design of the printer, and/or by day-to-day or even hour-to-hour variations in printer operations, such as might be caused by changes in environmental conditions.

What is needed therefore is a printer that is capable of self-calibration. One such printer is described in U.S. Pat. No. 6,086,274 in which a so called line printer is described having a color measuring head for color reflection measurements. The color measuring head is arranged to be fixed to a printer carriage in lieu of or in addition to the printing head, with the color measuring head being oriented toward a paper passage plane. The color measuring head is in communication with amplifying, control and evaluating electronic units arranged internally or externally of the printer. The color measuring head enables the line printer to be used not only for its inherent printing function but also for colorimetric measurements and for computing and using a color profile, to thereby automate a color characterizing process. In the '274 patent, the measuring head can automatically scan, line by line, the color fields of a previously printed test chart and the printing mechanism can be utilized for continuous scanning operation. Using the arrangement described in the '274 patent, the printing and measuring functions are performed in one run of a test chart. The printing and measuring operations are offset by a small time interval only, which is especially advantageous if the color measurement is not effected on a test chart but rather during the output of images. Measurements of this latter type are described as being performed directly in the image area of interest if a predetermined color is required to be maintained at predetermined portions of a printed image.

However, it will be appreciated that the printing of a test chart for calibration delays printing of images and that consumes meaningful amounts of receiver media that could otherwise be used for printing images. Conversely, not all of the colors required for calibration will necessarily be printed in images that are printed within a time period within which it may be necessary to complete calibration or printed within areas that are sized to permit color measurement.

Accordingly, what is needed is a self-calibrating printer that is adapted to execute an on demand self-calibration processes without requiring the printing of separate test images, using little if any additional receiver media, and without delaying the printing of images.

SUMMARY OF THE INVENTION

Figure 1:
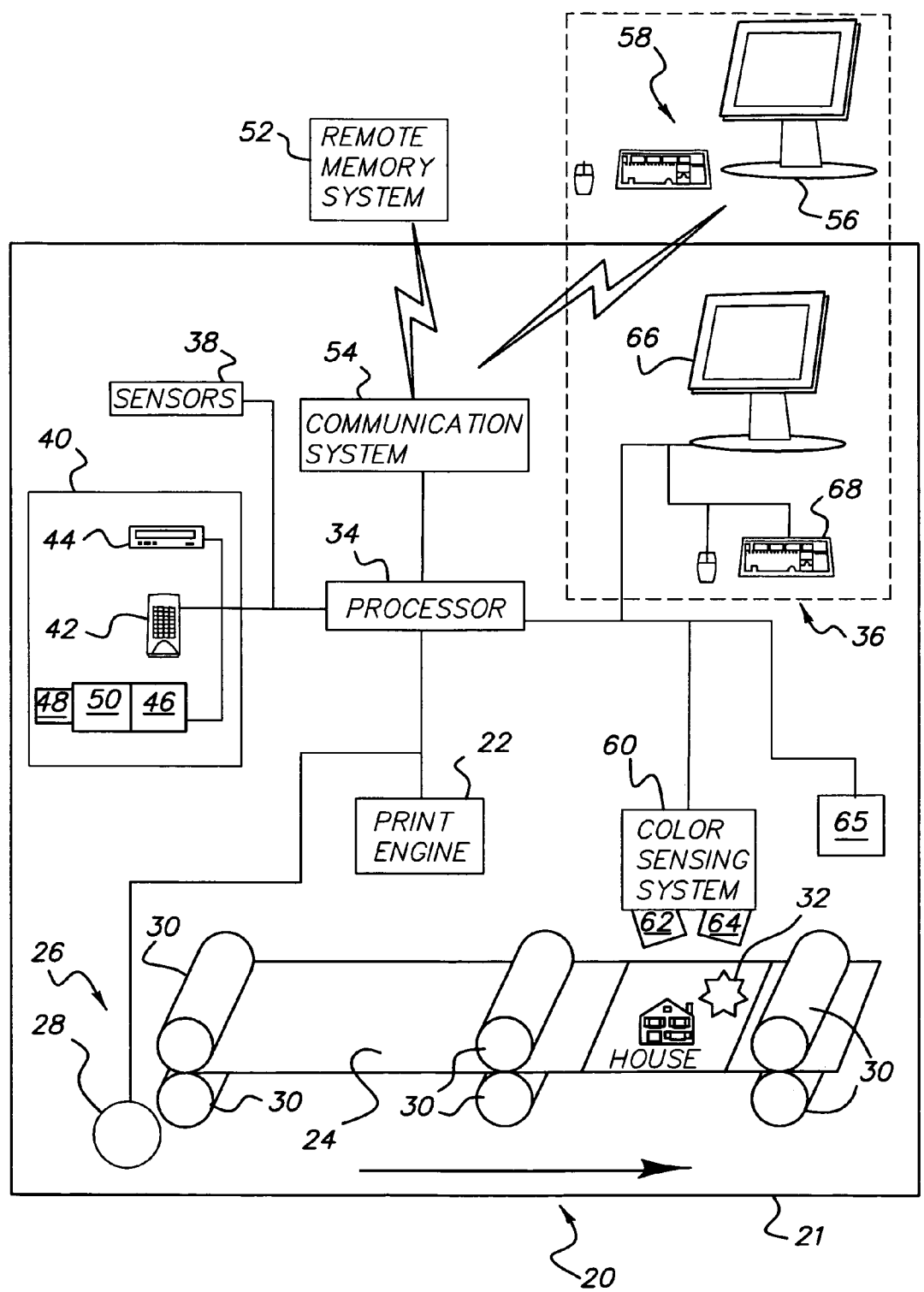
FIG. 1 shows one embodiment of a self-calibrating printer.

In one aspect, a method for operating a printer is provided. The method comprises the steps of: receiving a print order associated with image data for use in printing a plurality images; converting the image data into actions to print the plurality of images on a receiver medium with print adjacent areas between the printed images, the converting being performed in accordance with printer settings; printing a first set of color patches in the print adjacent areas when each of the first set of calibration color patches can be printed in the print adjacent areas; printing a second set of color patches in the print adjacent areas when each of the first set of color patches cannot be printed in the print adjacent areas; and sensing the color of each printed color patch and recalibrating the printer settings based upon the sensed colors so that specific colors are printed in response to particular image data; wherein there are fewer color patches in the second set of color patches than in the first set of color patches.

In another aspect, a method for operating a printer is provided. The method comprises the steps of: receiving a print order associated with image data for use in printing a plurality of images; converting the image data into instructions to print the plurality of images on a receiver medium with a print adjacent area between the printed images, the converting being performed in accordance with printer settings that relate particular image data with printer code values that are used in causing specific colors to be printed; determining a number of print adjacent areas that will exist when the images are printed; printing the images according to the instructions, and while printing the images, printing a first set of color patches within the print adjacent areas when the number of print adjacent areas is within a first range or printing a second set of color patches within the print adjacent areas when the number of print adjacent areas is within a second range, the second range being lower than the first range; and sensing the color of each printed color patch and determining whether to recalibrate the printer settings based upon the sensed colors so that the particular colors are printed in response to particular image data.

In another aspect, a method for operating a printer is provided that prints images in accordance with printer settings. The method comprises the steps of: receiving a print order associated with image data for use in printing a plurality of images; determining whether conditions exist under which recalibration of the printer settings is to be performed; printing the set of images on the receiver medium with at least one print adjacent area between the printed images when it is determined that conditions exist under which recalibration of the printer settings is to be performed with each print adjacent area being sized so that at least one color patch can be printed therein, the color patch being of a size that can be sensed by a color sensing system; and printing the set of images on the receiver medium with a reduced size print adjacent area between the printed images when it is determined that conditions do not exist under which recalibration of the printer settings may be necessary, the reduced size print adjacent area being smaller than print adjacent areas sized to have a color patch so as to reduce the amount of receiver material occupied by a reduced size print adjacent area.

In yet another aspect a printer is provided. The printer comprises: a print engine adapted to apply donor material onto a receiver medium; a medium transport adapted to position the print engine and receiver medium relative to each other; a color light sensor positioned to sense printed colors on the receiver medium; and a processor adapted to receive a print order and to obtain a plurality of images for printing and to cause the print engine and medium transport to cooperate to print the plurality of images on the receiver medium with a print adjacent area between the printed images, the processor further being operable to cause the color patches of a selected color patch set to be printed in the print adjacent areas associated with the plurality of printed images. The processor uses the color light sensor to sense the colors of the color patches and to determine revised printer settings based upon a comparison of the sensed colors and the colors that the processor instructed the print engine to print in the sensed color patches. Wherein the processor selects the set of color patches from among a plurality of color patch sets based by selecting a first patch set when all of the color patches of the first color patch set can be printed in the print adjacent areas, and selecting a second color patch set when all of the color patches of the first color patch set cannot be printed in the print adjacent areas.

In still another aspect of the invention, a printer is provided. The printer comprises: a print engine adapted to apply donor material onto a receiver medium in accordance with printer code values; a color light sensor to sense printed colors on the receiver medium; a medium transport adapted to position the print engine and receiver medium relative to each other and to position the color light sensor and receiver medium relative to each other; and a processor adapted to receive a print order requesting the printing of a plurality of images and to cause the print engine and medium transport to cooperate to print the plurality of images on the receiver medium with print adjacent areas between the printed images. The processor is further adapted to transmit a printer code value to the print engine and other signals to the medium transport to cause the print engine and medium to cooperate to print a calibration verification color patch in a print adjacent area, and to send signals to the medium transport and color light sensor to cause the color light sensor to sense the color of the calibration verification color patch. The processor has printer settings stored therein that are used in causing the print engine to print images. The processor determines whether the printer settings should be recalibrated based upon the sensed color of the calibration verification color patch and the printer code value used to print the calibration verification color patch.

DETAILED DESCRIPTION OF THE INVENTION

FIG. 1 shows a first embodiment of a printer 20. In the embodiment of FIG. 1, printer 20 comprises a housing 21 having a print engine 22 that applies markings or otherwise forms an image on a receiver medium 24. Print engine 22 can record images on receiver medium 24 using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, print engine 22 will be described as being of a type that generates color images. However, it will be appreciated that this is not necessary and that the claimed methods and apparatuses herein can be practiced with a print engine 22, monotone images such as black and white, grayscale or sepia toned images.

A medium advance 26 is used to position a receiver medium 24 and/or print engine 22 relative to each other to facilitate recording of an image 32 on receiver medium 24. Medium advance 26 can comprise any number of well-known systems for moving receiver medium 24 within printer 20, including motor 28, driving pinch rollers 30, a motorized platen roller (not shown) or other well-known systems for the movement of paper or other types of receiver medium 24. Medium advance 26 is also used to position a receiver medium 24 relative to a color sensing system 60 after image 32 has been printed on the receiver medium 24 by print engine 22.

Print engine 22, medium advance 26 and color sensing system 60 are operated by a processor 34. Processor 34 can include, but is not limited to, a programmable digital computer, a personal computer system, a programmable microprocessor, a programmable logic processor, a series of electronic circuits, a series of electronic circuits reduced to the form of an integrated circuit, or a series of discrete components. Processor 34 can be a single unit or a combination of separate processing units connected by a communication link. Certain functions of processor 34 described herein may be performed by a portion of a processor 34 that is within housing 21, while other functions can be performed by a portion of processor 34 that is exterior to housing 21 such as, for example, a personal computer that is connected to printer 20 by way of a wired or wireless connection. Processor 34 operates printer 20 based upon input signals from a user input system 36, sensors 38, a memory 40 and a communication system 54.

User input system 36 can comprise any form of transducer or other device capable of receiving an input from a user and converting this input into a form that can be used by processor 34. For example, user input system 36 can comprise a touch screen input, a keyboard, a keypad, a mouse, a touch pad input, a 4-way switch, a 6-way switch, an 8-way switch, a stylus system, a trackball system, a joystick system, a voice recognition system, a gesture recognition system or other such systems.

Sensors 38 are optional and can include light sensors and other sensors known in the art that can be used to detect conditions in the environment surrounding printer 20 and to convert this information into a form that can be used by processor 34 in governing operation of print engine 22, medium advance 26 and/or other systems of printer 20. Sensors 38 can include audio sensors adapted to capture sounds. Sensors 38 can also include positioning and other sensors used internally to control printer operations.

Memory 40 can include conventional memory devices including solid state, magnetic, optical or other data storage devices. Memory 40 can be fixed within printer 20 or it can be removable. In the embodiment of FIG. 1, printer 20 is shown having a hard drive 42, a disk drive 44 for a removable disk such as an optical, magnetic or other disk memory (not shown) and a memory card slot 46 that holds a removable memory 48 such as a removable memory card and that has a removable memory interface 50 for communicating with removable memory 48.

Figure 2:
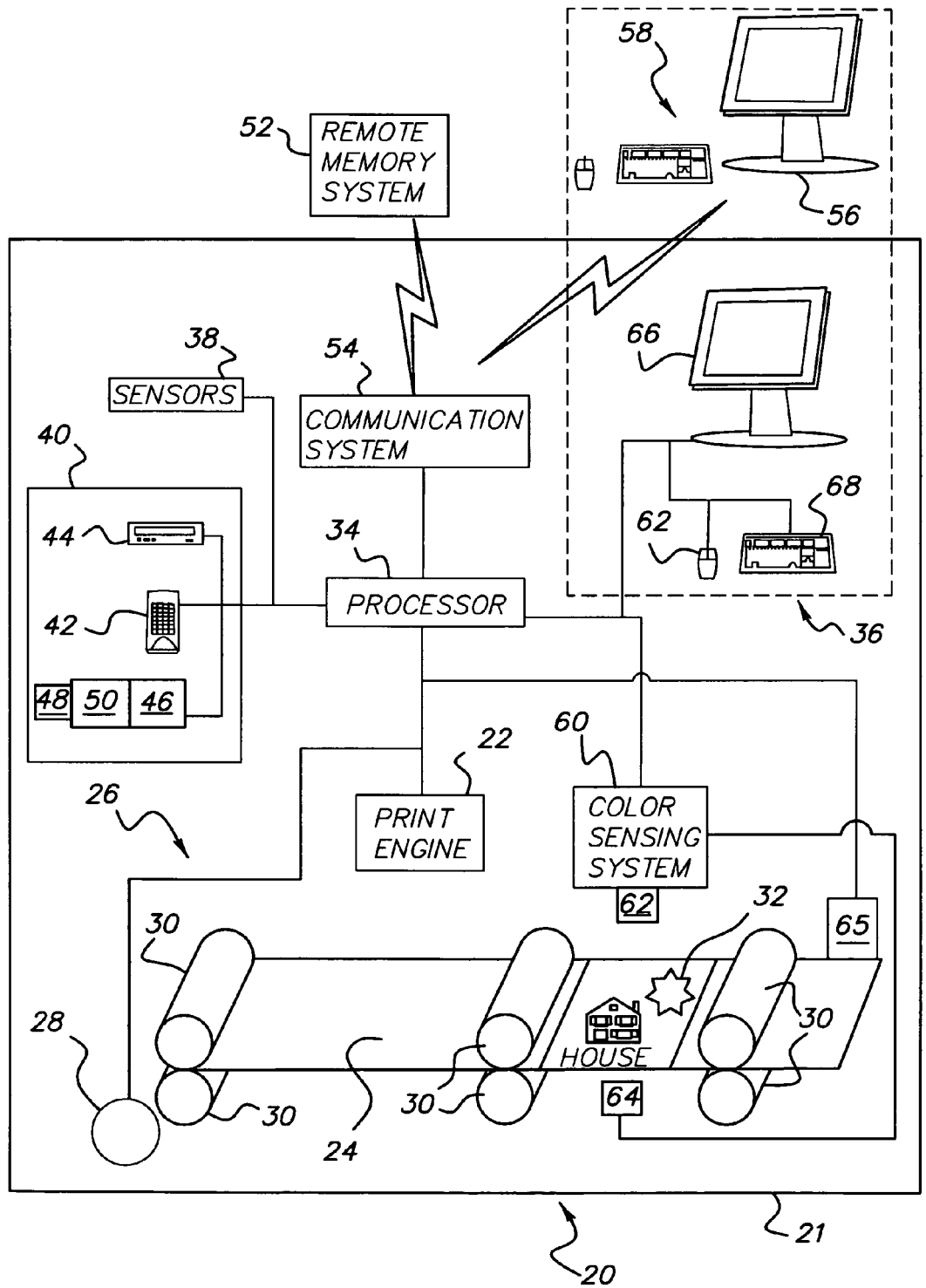
FIG. 2 shows another embodiment of a self-calibrating printer.

In the embodiment shown in FIGS. 1 and 2, printer 20 has a communication system 54 for communicating with a remote memory system 52 that is external to printer 20, a remote display 56, remote input 58, and, optionally with a local display 66, and/or a local input 68. Communication system 54 can be for example, an optical, radio frequency or transducer circuit or other system that converts image and other data into a form that can be conveyed to a remote device such as remote memory system 52 or remote display device 56 by way of an optical signal, radio frequency signal or other form of signal. Communication system 54 can also be used to receive a digital image and other information from a host computer or network (not shown). In this way, data including, but not limited to, control programs, digital images and metadata can also be stored in remote memory system 52 such as a personal computer server, computer network or other digital data storage system. Communication system 54 provides processor 34 with information and instructions from signals received thereby.

In the embodiment illustrated, local display 66 communicates with processor 34 without involvement of communication system 54. Similarly, local input 68 can also provide signals to processor 34 without involvement of communication system 54.

As is also illustrated in FIG. 1, printer 20 includes a color sensing system 60 having a light source 62 and a light sensor 64. In one embodiment, color sensing system 60 has a light source 62 that is adapted to provide a white or other neutral light color to a portion of receiver medium 24 after image 32 has been formed thereon. In this embodiment, light sensor 64 comprises an opto-electronic circuit having a sensing surface (not shown) that can sense a non-absorbed portion of the light applied to receiver medium 24 by light source 62 and that can generate a signal that is indicative of the color and intensity of the non-absorbed light. Examples of such a color sensing type of light sensor 64 include, but are not limited to, a densitometer, a color imager, a colorimeter or like device.

In an alternative embodiment, light source 62 comprises a multi-color light source that can automatically, or in response to signals from processor 34, apply a pattern of differently colored light to a portion of receiver medium 24. In this alternative embodiment, light sensor 64 can be of a type that does not necessarily measure the color of the non-absorbed portion of the light, but rather that measures the intensity of the non-absorbed portion of the light using a plurality of light sensors, each adapted to determine an intensity of light within a specific range of frequencies and that provide signals indicative thereof to processor 34 so that processor 34 can combine the signals to determine the color of the portion of receiver medium 24 being sensed thereby.

Color sensing system 60 can sense light that is reflected by receiver medium 24 or it can sense light that is transmitted through receiver medium 24. FIG. 1 illustrates a reflected light type of sensing wherein a light source 62 is positioned to direct a light onto receiver medium 24 and color light sensor 64 is positioned to receive at least a portion of the light that is reflected by the illuminated portion of receiver medium 24. Where receiver medium 24 is at least partially transparent, color sensing system 60 can be arranged as illustrated in FIG. 2 wherein light source 62 is positioned to apply light to such a partially transparent receiver medium 24 and light sensor 64 is positioned to sense the color of non-absorbed light that is transmitted therethrough.

Color sensing system 60 is positioned relative to print engine 22 and medium advance 26, so that it can detect colors that have been printed on receiver medium 24. Color sensing system 60 can be positioned as a part of a translating printhead where print engine 22 incorporates such a printhead and can move therewith to sense colors at or about the time of printing. Alternatively, color sensing system 60 can have a separate translation system (not illustrated) that is adapted to allow color sensing system 60 to move separately from print head 22. In the embodiment illustrated, color sensing system 60 is held in a fixed position and can rely upon medium advance 26 to advance receiver medium 24 into a position wherein color sensing system 60 can determine a color thereof.

In one embodiment of this type, color sensing system 60 can also extend across a full printable width of receiver medium 24 so that the color of any portion of image 32 can be sensed without translating color sensing system 60 relative to receiver medium 24.

Color sensing system 60 operates in cooperation with processor 34 and provides signals to processor 34 from which processor 34 can determine the colors sensed by color sensing system 60. Color sensing system 60 can operate continuously, or can operate selectively, such as in response to signals from processor 34.

As is also illustrated in the embodiments of FIGS. 1 and 2, a receiver medium separation mechanism 65 such as a mechanical, thermal or other type cutter is optionally provided to separate printed receiver medium 24 into individual or collective final image portions and non-final image portions referred to herein as chads.

Figure 3A:
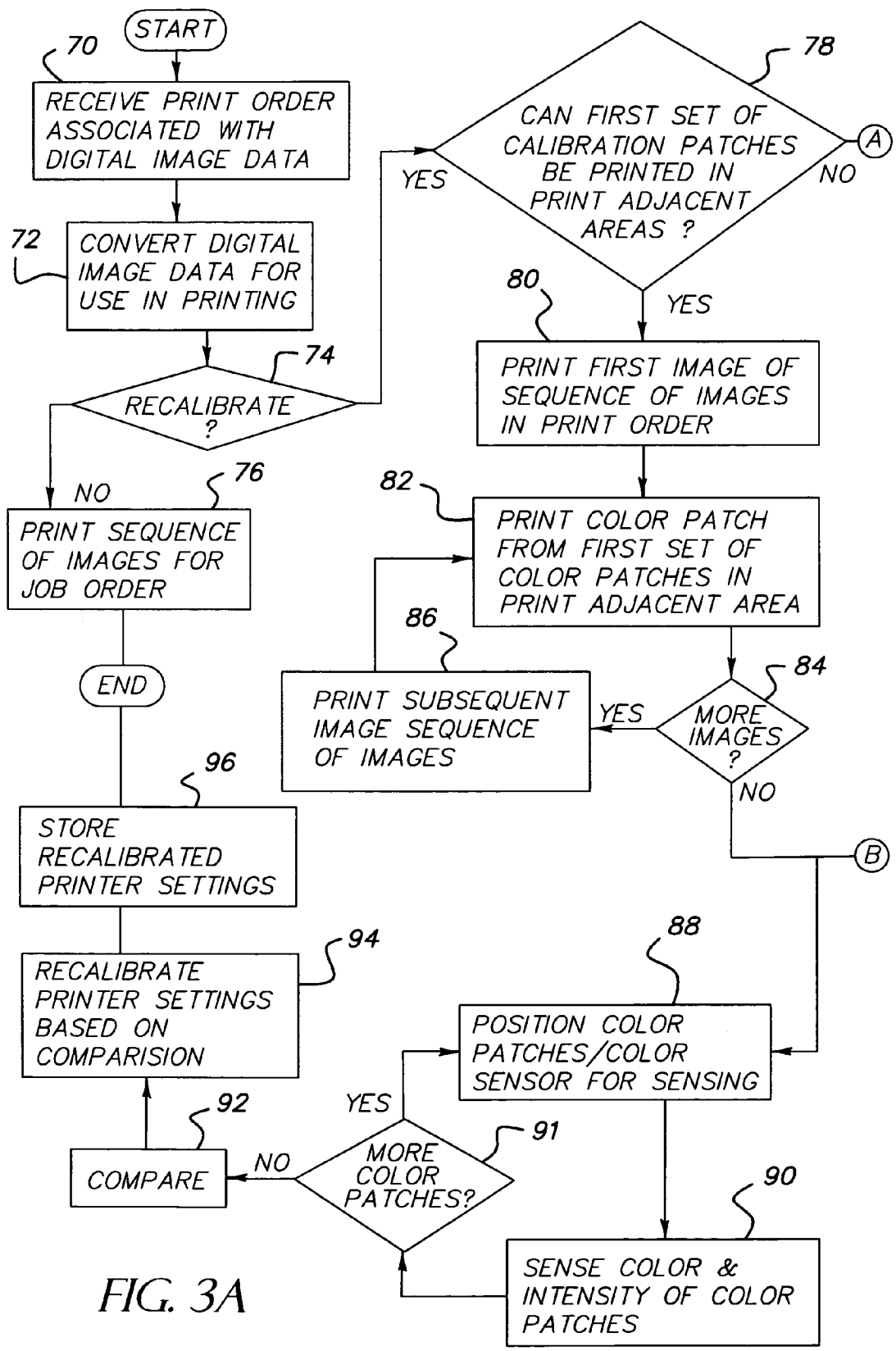
FIG. 3 shows a flow diagram of a method for operating a printer to self-calibrate the printer.
Figure 3:
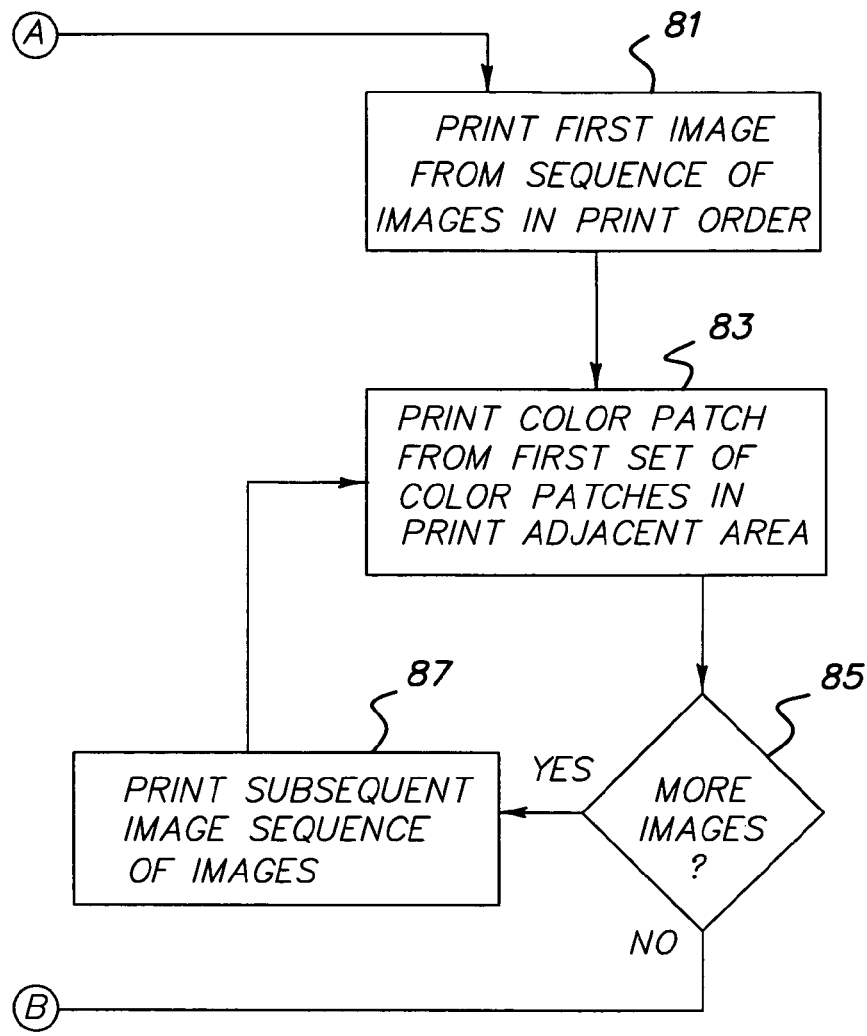
Figure 3:
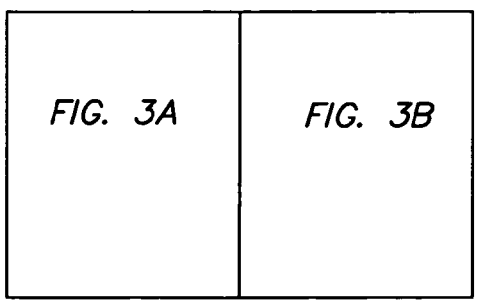

FIG. 3 provides a flow diagram showing one embodiment of a method for operating printer 20 of FIG. 1. As is shown in the embodiment of FIG. 2, a print order is received by printer 20 (step 70) providing instructions sufficient for processor 34 to begin a printing a sequence of images on receiver medium 24. Processor 34 can receive a print order in a variety of ways including, but not limited to, a receiving entries made at user input system 36. Processor 34 can also receive a print order by way of signals received at communication system 54, and/or in response to data provided by way of memory 40 including, but not limited to, data provided by way of a removable memory 48.

Each print order generally provides information from which processor 34 can determine what images are to be printed, how the images are to be printed and the quantity of each of the images that is to be printed. A print order can be associated with digital image data representing the image to be printed and, instructions for printing such an image. However, other print orders can be associated with image data by providing reference information instead of digital image data with the reference information being useable by processor 34 to obtain digital image data from an external source such as remote memory system 52. In some cases, the printing instructions can be provided in the form of Digital Print Order Format (DPOF) data that allows a user of a digital camera or other type of display device to define which of a set of stored images are to be printed, and can also provide information that identifies number of copies or other image information that can be used in fulfilling a print order. Processor 34 then begins to process the digital image data by converting the digital image data into a form that can be used by print engine 22 (step 72) and providing this data to print engine 22 which then takes printing actions, in concert, with medium advance 26 to form printed images (steps 76, 80, 81, 86, and 87).

The process of converting the digital image data into a form that can be used by print engine 22 involves converting the digital image data into printer code values or other data types that represent specific colors to be printed on receiver medium 24 to form an image. This is typically done in accordance with initial printer settings that include so called calibration information that provides a logical association between the colors called for in the image data and printer code values that are assumed to cause such colors to be printed by print engine 22 on receiver medium 24. Such calibration information can also include information that print engine 22 can use in determining printing actions to be taken in response to particular code values.

The initial printer settings can be established for example during an initial set up phase at a manufacturer's facility or elsewhere. However, because many aspects of printing, particularly color printing, are influenced by environmental conditions, printing process variations, and donor and receiver material variations, it is understood that, from time to time, it may be useful to recalibrate the initial printer settings to ensure that the colors that are printed correspond to colors called for in the print data.

Processor 34 then determines whether conditions exist under which recalibration of the printer settings is to be performed (step 74). Such conditions can be found where, for example, a user makes a request that the printer settings be recalibrated. Such a request can be made, for example, by way of user input system 36. Alternatively, processor 34 can be adapted to perform calibration when a sensor (not shown) indicates to processor 34 that either receiver medium 24 or a donor material supply has been changed or replenished, when a receiver medium or donor material type is changed, or when there has been a meaningful shift in ambient temperature, humidity or other environmental conditions since a time of the last calibration. In still other alternative embodiments, processor 34 can monitor factors such as the number of prints since the last printer calibration of the printer settings and an amount of time since the last calibration to determine when printer settings should be recalibrated. In yet another embodiment, processor 34 can be adapted to determine that printer settings should be recalibrated on a periodic basis such as at a particular time of a day or week. In a further embodiment described in greater detail below, processor 34 is adapted to print a calibration verification mark during the printing of images and to sense the color of the calibration verification mark (FIG. 9), processor 34 can determine that a need for calibration of printer 20 exists based upon whether the color of the calibration verification mark is within a range of acceptable colors.

In the embodiment of FIG. 3, when processor 34 determines that no conditions exist suggesting a need for recalibration (step 74), processor 34 can cause sequence of images 100a-100n from the print order to be printed in accordance with initial printing settings. As noted generally above, such printing settings can provide calibration information that can be used the way in which processor 34 converts image data into code values, and the way in which print engine 22 converts code values into colors in an image. Such printer settings can also be used to govern other aspects of the printing process, such as printing settings that provide information that processor 34 uses when processor 34 operates medium advance 26. However, such printer settings can also dictate aspects of maintenance of the printing process, such as when and how print engine 22 is to be adjusted and/or maintained and provides code values to print engine 22 from which print engine 22 can determine colors that are to be printed at particular locations on receiver medium 24 to a receiver medium 24 having a sequence of images 100a, 100b, 100c, 100n on receiver medium 24 as is illustrated in FIG. 4.

Figure 4:
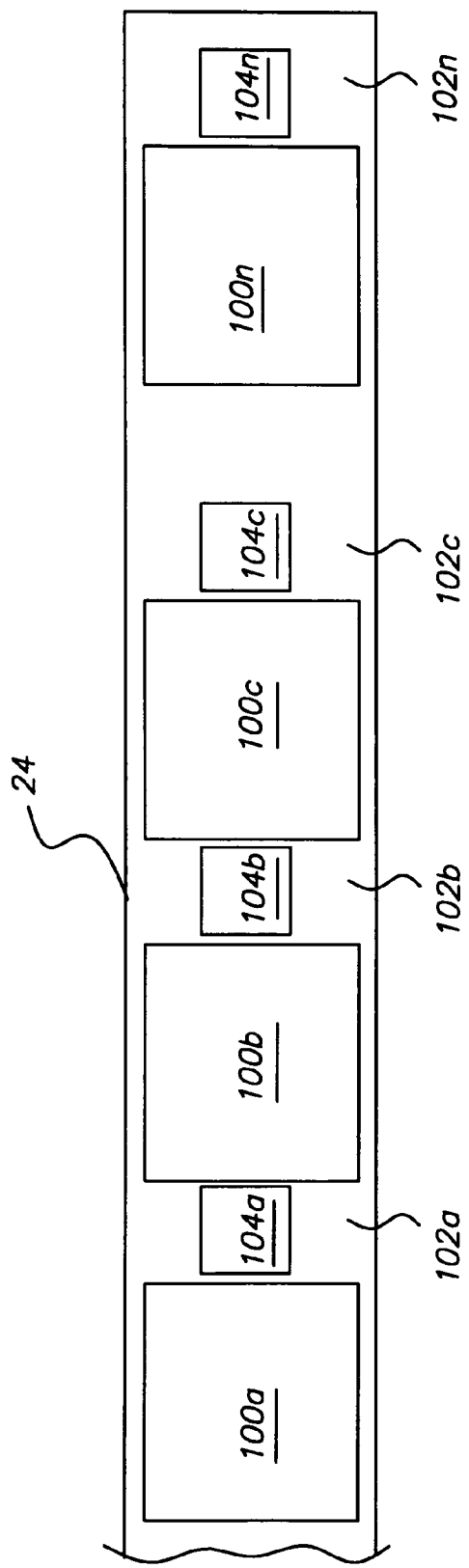
FIG. 4 shows a receiver medium with an initial color patch set printed in print adjacent areas during the printing of a set of images.

As is also illustrated in FIG. 4, processor 34 is adapted to print images 100a-100n of the print order such that each image 100a-100n has one of a plurality of print adjacent areas 102a-102n associated therewith. Print adjacent areas 102a-102n are not intended to comprise as a part of the printed image that is eventually supplied by printer 20 to a user but that do occupy some portion of length of the receiver medium 24 that is adjacent to each printed image. For economy of donor material and receiver medium 24, the size of such print adjacent areas 102a-102n can be minimized. Print adjacent areas of the type illustrated in FIG. 4, can be used for purposes such as supplying sufficient receiver material 24 to allow medium advance 26 to properly grip and position receiver material 24 before, during or after printing. Further, print adjacent areas 102a-102n allow some space to accommodate variations in image placement on receiver medium 24 caused by manufacturing tolerances, receiver media tolerances and operational variations.

In the embodiment of printers 20 that print images using a roll supplied web of receiver medium 24, print adjacent areas 102a-102n can take the form of chads that are typically separated from printed images 100a-100n at or about the time that printed images 100a-100n are separated from the web of receiver medium 24. Similarly, in printers 20 that use sheet form receiver material 24, print adjacent areas 102a-102n can take the form of a chad and can be separated prior to delivery to a user. In either embodiment, separation mechanism 65 can be used for this purpose. However, it will be appreciated that, in certain embodiments, print adjacent areas 102a-102n can be supplied as a portion of a printed image that is delivered to a user. In some of these latter embodiments, print adjacent areas 102a-102n can be positioned on a perforated portion of receiver medium 24 to facilitate manual separation from the printed image after printing.

As is illustrated in FIGS. 3 and 4, when processor 34 determines that recalibration is to be performed (step 74) processor 34 selects a set of color patches that are to be printed for use in the recalibration process (step 78). In the embodiment of FIG. 3, this selection involves choosing between two or more possible color patch sets including at least a first color patch set and a second color patch set (step 78).

Processor 34 can be adapted to define the size of the print adjacent areas 102a-102n between images 100a-100n based upon a mode of operation. Alternatively, processor 34 can define the size of print adjacent areas 102a-102n in a constant fashion, in accordance with a predefined pattern or individually for each print adjacent area. As will be discussed in greater detail below, the selection of the size of print adjacent areas can be made in a dynamic manner based upon printer conditions. It will be appreciated that the size of print adjacent area 102 that has a color patch 104 printed therein, will be defined in part by a size of color patch 104 printed therein. The size of a color patch 104, in turn, is defined to be of a size that is sufficient to allow color sensing system 60 to measure the color of color patch 104. It will also be appreciated that in certain embodiments, processor 34 can conserve receiver medium 24 by reducing the size of print adjacent areas 102 that do not have color patches 104 printed therein. Such reduced size print adjacent area can be of a size that is smaller than the size used for print adjacent areas that are used for printing color patches 104.

In the embodiment illustrated in FIG. 3, processor 34 is adapted to select from among two or more color patch sets based upon whether all of the colors in a color patch set can be printed in the print adjacent areas (step 78) during the printing of the images 100a-100n of the job order. This can be done in a variety of ways. For example, where only one color patch can be printed in a print adjacent area, processor 34 can select a set of color patches having a number of color patches that is less than or equal to the number of print adjacent areas 102a-102n that will be printed during printing of the images 100a-100n. Similarly, where multiple color patches can be printed in print adjacent areas 102a-102n on receiver medium 24 in a way that allows each to be sensed by color sensing system 60, processor 34 can select a color patch set based upon the total number of color patches that can be printed in each print adjacent area 102a-102n and later sensed by color sensing system 60 multiplied by the number of print adjacent areas 102a-102n.

In one embodiment, the number of print adjacent areas 102a-102n is determined based upon the number of images requested in a print order submitted by a single user. However, it will be appreciated that in other embodiments, the print order can comprise the sum of a plurality of print orders from one or more users with the number of print adjacent areas being determined based upon the total number of images printed.

To the extent that it is desired that the printing of color patches in the method shown in FIG. 3 is performed using print adjacent areas 102a-102n, the number of color patches that can be printed during printing of a set of images 100a-100n will be in part functionally related to factors such as the number of images 100a-100n, the number of print adjacent areas 102a-102n, the number of color patches 104a-104n that can be printed in each print adjacent areas 102a-102n and the extent to which color sensing system 60 can sense more than one color patch in each print adjacent area. The color patches from the selected set of color patches are then printed (steps 80-86).

Accordingly, in the embodiment of FIG. 3, processor 34 is adapted to select a color patch set for printing from among more than one set of color patches including at least a first set and a second set wherein the first set requires the printing of more color patches than the second set (step 78). As is illustrated in FIG. 3, processor 34 selects the set of color patches by first determining whether the set of color patches 104 can be printed in the print adjacent areas 102a-102n that will be present adjacent to printed images 100a-100n of the print order. Where processor 34 determines that all of the color patches of the first set can be printed in print adjacent areas 102a-102n, processor 34 selects the first set of color patches and returns to execute steps 82, 84 and 86 of the method of FIG. 3 causing the images of the print order to be printed with color patches in print adjacent areas 102a-102n.

Processor 34 causes receiver medium 24 and/or color sensing system 60 to be positioned so that color sensing system 60 can sense a first color printed in a first color patch 104a. Typically, this is done by using medium advance 26 to advance receiver medium 24 from print engine 22 along a path leading to color sensing system 60. In one alternative embodiment where color sensing system 60 is positioned on a portion of print engine 22, such as a print head, such positioning can be made as a part of the printing process (step 88).

Color sensing system 60 makes color measurements of a first color patch 104a and provides signals to processor 34 from which processor 34 can determine the color and intensity of the color of first color patch 104a (step 90).

Steps 88 and 90 are repeated (step 91) until the color and intensities of all of the remaining color patches 104a-104n are measured.

Processor 34 compares the printer code values used to cause the printing of each of color patches 104a-104n against the color and intensity information measured from the respective color patch (step 92). From this comparison, processor 34 then determines recalibrated printer settings intended to cause print engine 22 to generate a particular color on receiver medium 24 in response to a particular printer code value. As desired, processor 34 can also determine printer settings that can be used by processor 34 in converting image data into printer code values. A wide variety of algorithms are known for calculating such printer settings. An association between image data and printer code values made during this step can take a variety of logical structures. For example, it can take the form of a look up table (LUT) or any of a variety of other structures that can define such an association such as algorithms, computer programming, mathematical equations, fuzzy logic structures and other logical constructs that can be implemented using processor 34.

The recalibrated printer settings are stored in memory 40 (step 96) and used in future printing operations. In this way, a printer 20 can perform automatic self-calibration as a part of a printing process and with little additional receiver medium consumption.

There is a wide range of useful embodiments of the above described method that can be implemented in a printer 20, some of which will be described in greater detail below. Specifically, it will be appreciated that in practice there are a wide variety of color calibration test color patterns that provide color patches that can be used for color calibration. For example, there are a number of different color patch combinations that can be used. Color patch sets that can be used for color calibration include, but are not limited to, the Kodak Q-13 color patch set and the Kodak Q-14 color patch set which require printing only a limited number of additive and subtractive primary colors at full saturation and in varying degrees of lightness. Alternative color patterns include, but are not limited to, so-called HSL space color patch sets in which color patches across a range of hue and lightness settings intended to comprise a plurality of colors that can be combined. Further, so called neutral density colors can be printed in the color patches as desired.

Figure 5:
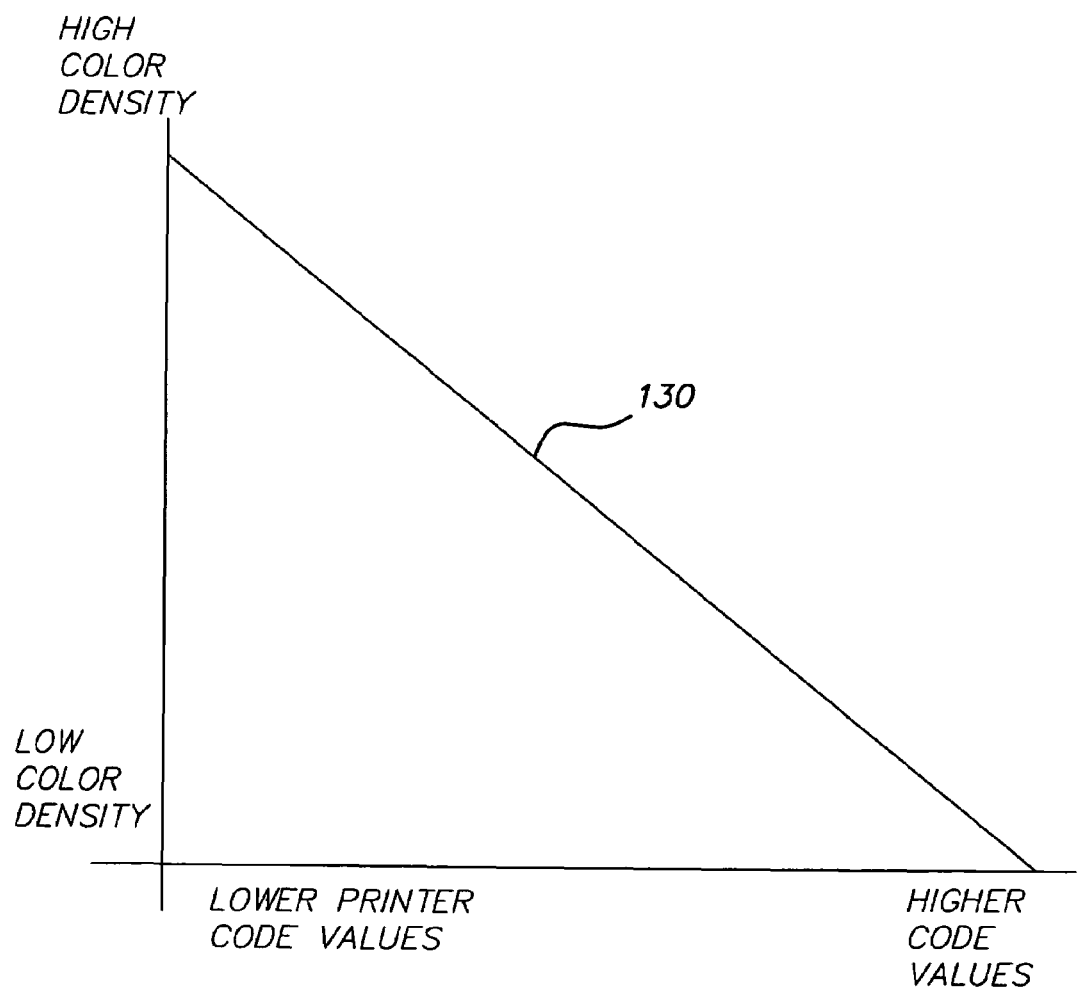
FIG. 5 shows a color aim.
Figure 6:
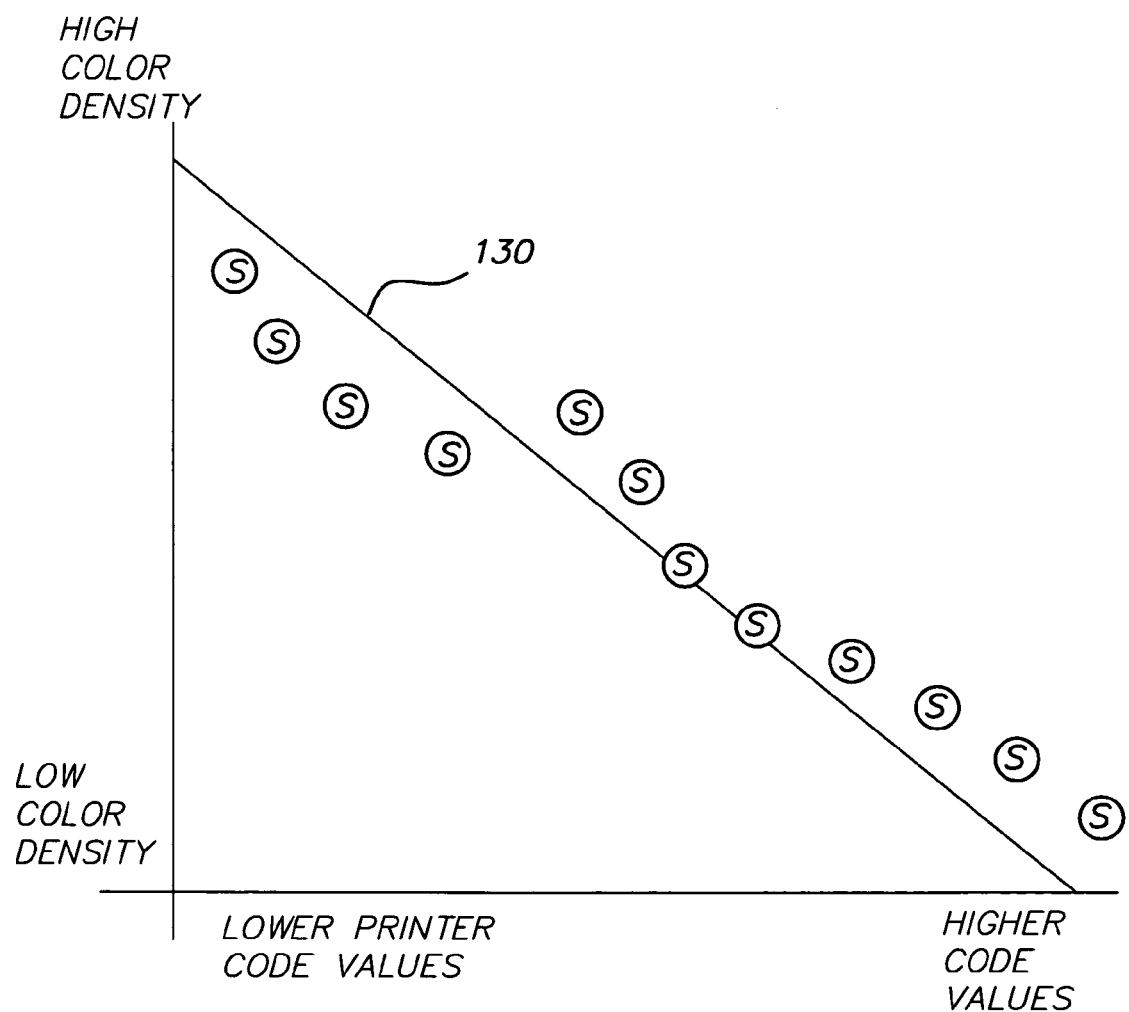
FIG. 6 shows an illustrative example of a color aim with samples and an interpolating plot.

Some color patch sets allow for recalibration to be performed based upon a limited number of different color patches while others demand a larger number. Typically, such recalibration is performed with the intent of providing a predictable color response to a particular code value. This is generally known in the printing arts as a color aim. One example of such a color aim 110 is illustrated in FIG. 5. As is illustrated in the embodiment of FIG. 5, color aim 110 comprises a generally linear printed color response across a range of color code values, however, in other embodiments, color aim 110 can be non-linear. As shown in FIG. 6, during color calibration, color sensing data points S are obtained representing the actual colors printed and color sensing data points S are mapped against code values used in generating such a color patch and against the color aim 130. From this a particular code value 134 used in printing one of the color sensing data points can be associated with different code value 136 that actually causes that color to be printed. Such an association can be made for each sampled color.

Many modern printers are capable of printing, for example, more than 16 million colors. It is unusual that such a number of patches will be printed during a single time period between calibrations. Accordingly, determination of the recalibrated printer settings typically involves interpolating information for colors that were not actually sensed. Such interpolation 132 is used to predict what colors print engine 22 will print in response to a code value that was not used to print a color patch during recalibration. In general, when more color sensing data points are obtained, this interpolation can be made more reliable, when fewer samples are obtained this interpolation can be less reliable. Accordingly, when fewer samples are obtained, it can be useful to select different colors and/or different interpolation schemes that are adapted for use with particular sets of calibration colors. Further, in certain types of printing it can be useful to weight the color sensing data points toward particular colors sets so that, for example, calibration is done using more color sensing data points that reflect higher code values than using color sensing data points that reflect lower code Values. In this way, images that have a greater proportion of lower code value colors, can be printed with greater color accuracy while less color accuracy is tolerated in the high code value regions because minor color variations in the images can produce differences that are more apparent.

However, where processor 34 determines that first set of color patches cannot be printed in the print adjacent areas 102*a*-102*n* of the set of images of the print order (step 78), processor 34 then select the second, smaller, set of color patches for printing and the process returns to step 81 of FIG. 3.

Figure 7A:
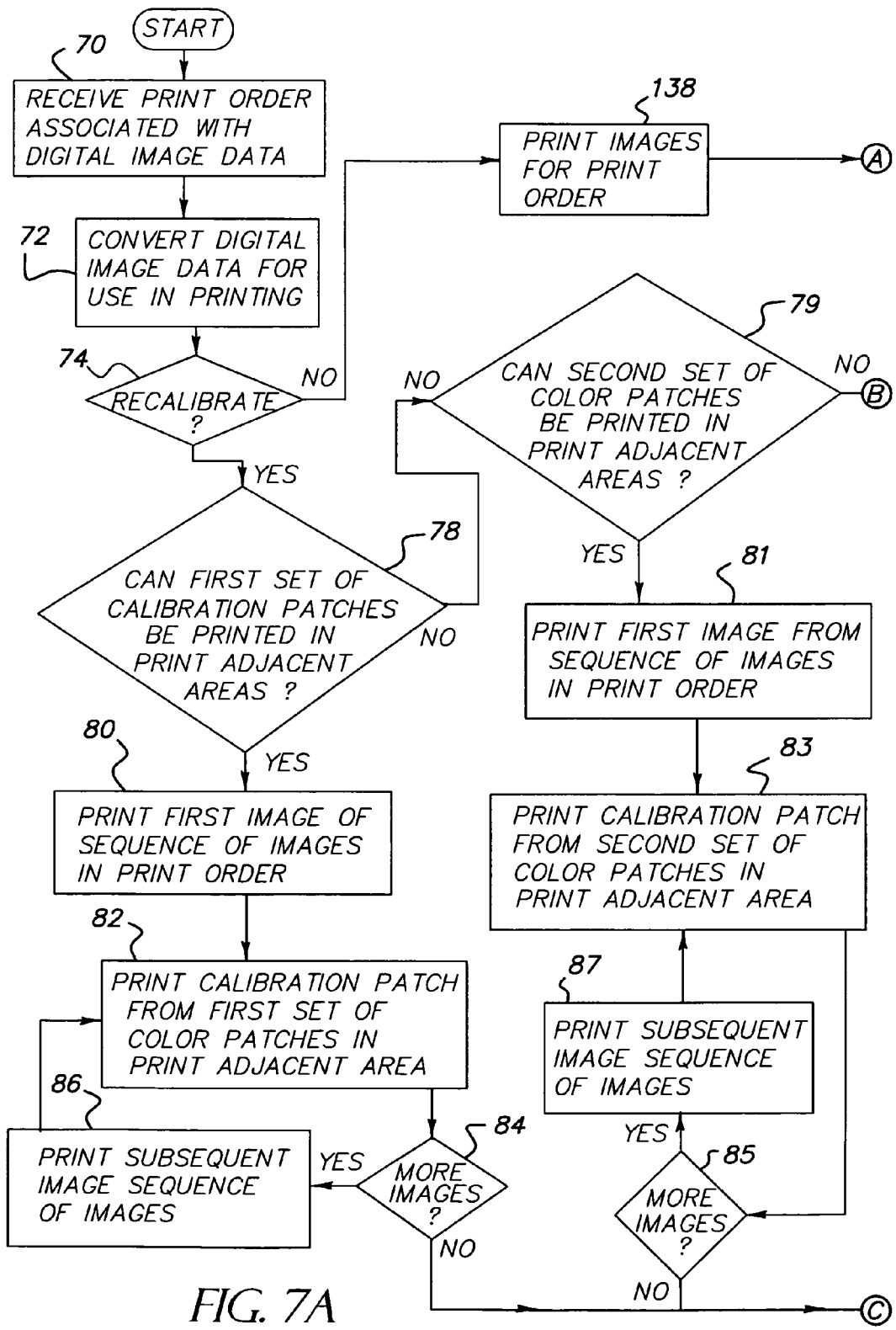
FIG. 7 shows another embodiment of a method for operating a printer.

FIG. 7 is a flow diagram showing yet another embodiment of a method for operating printer 20. In this method, three types of color patch sets are used. The first and second patch sets are as generally described above, however, the third patch set comprises at least one calibration verification color patch. The calibration verification color patch has a color that allows a determination to be made as to whether recalibration of the printer settings is necessary or advisable based upon the color and intensity of the calibration verification color patch. An example of such a calibration verification color patch is one that requires printing in all color channels to form a color from which it can be readily discerned when one of the color channels is not printing a desired color. One example of this is a so-called neutral density patch.

In this embodiment, processor 34 is adapted to receive a print order (step 70) and to convert digital image data for use in printing (step 72). If processor 34 determines to recalibrate then processor 34 determines whether the first set of color patches can be printed in the print adjacent areas (step 78). Processor 20 then determines whether conditions exist that suggest a need or potential need to recalibrate printer settings (step 74). Where this is possible, steps 80, 82, 84, 86, 88 and 90 are repeated generally as described above. However, where this is not possible, processor 34 determines whether a second set of color patches 104*a*-104*n* can be printed in the print adjacent areas (step 79) where this is possible steps 81, 83, 85 and 87 can be performed as described above. Where this is not possible, such as where a limited number of images are to be printed, processor 34 is adapted to cause at least one verification color patch to be printed during printing of the images (steps 138 and 140). The color of the calibration verification color patch is then positioned for sensing, sensed and compared to the code values used to cause the printing of the calibration verification color patch (steps 142 and 144) and it is determined from this whether the printer settings are within a range that is acceptable (step 146).

Where the printer settings are not within an acceptable range, a flag can be set (step 148) indicating that recalibration (steps 74, 78-90) is to be performed.

Figure 8A:
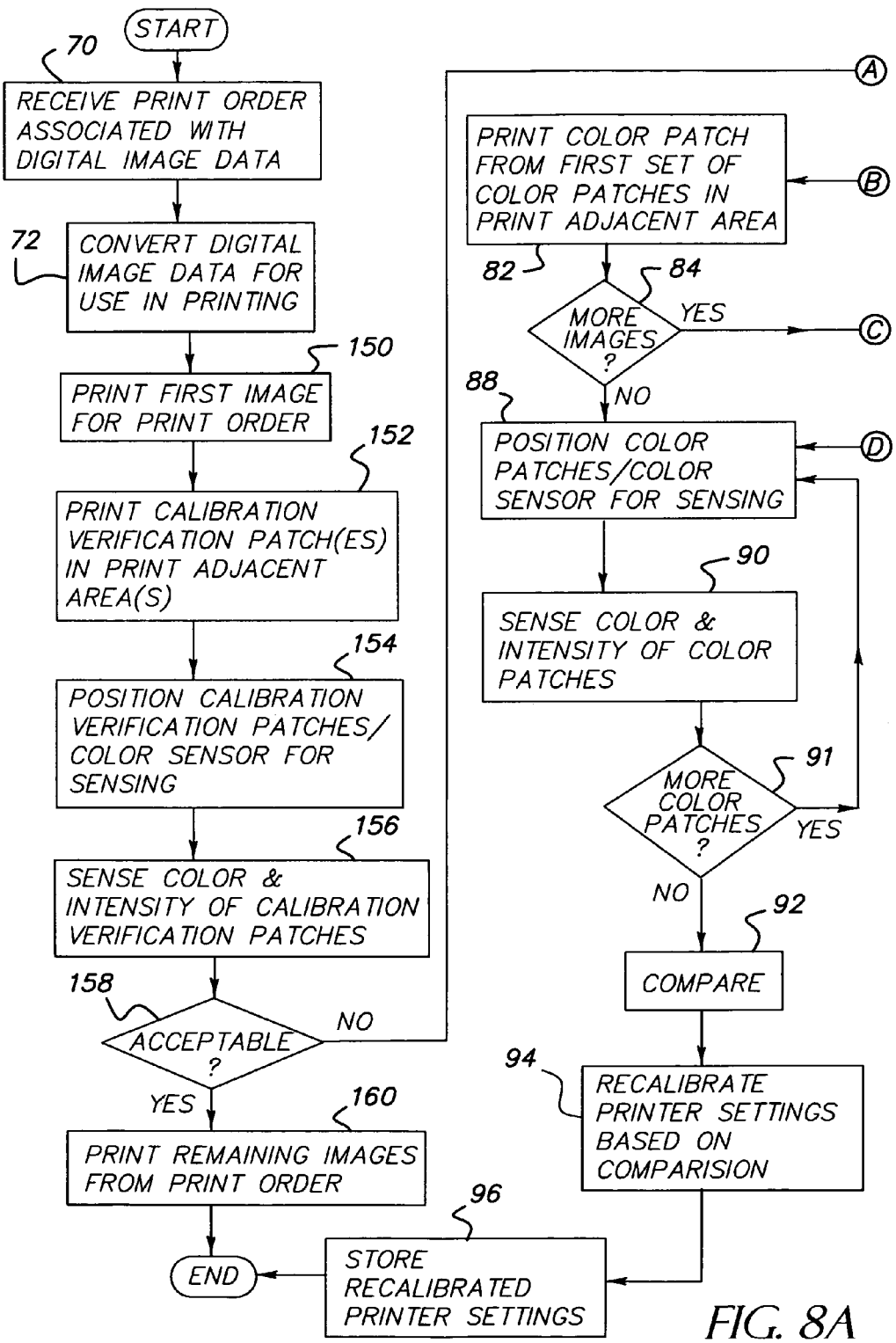
FIG. 8 illustrates an alternative embodiment of a method for operating a printer.
Figure 9:
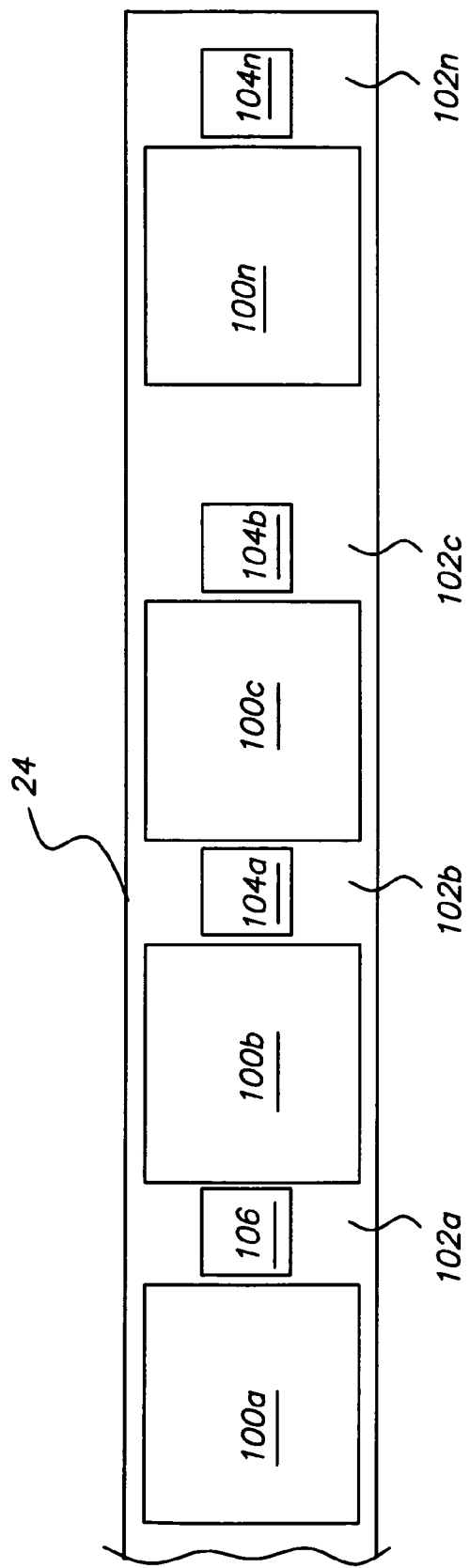
FIG. 9 shows a receiver medium having a plurality of images, a calibration verification patch and color patches.

FIG. 8. illustrates an alternative embodiment that is similar to the embodiment of FIG. 7. FIG. 9 shows a receiver medium 24 printed in accordance with the method of FIG. 8. In this embodiment, at least one calibration verification patch 106 is printed in a print adjacent area associated with a first printed image of each print order (steps 150 and 152). The calibration verification patch 106 and color sensing system 60 are then positioned so to enable sensing of the color and intensity of the calibration verification patch (step 154) and such sensing is performed (step 156) as generally described above. The color of the calibration verification color patch set is compared to the code values used to cause the printing of the calibration verification color patch and it is determined from this whether the printer settings are within an acceptable range (step 158). Where this is so, the remaining images of the print order can be printed (step 160). Where the printer settings are not within the preferred range processor 34 proceeds to step 162 wherein it is determined whether a first set of color patches can be printed in the print adjacent areas 102*b*-102*n* that will exist when the remainder of images 100*b*-100*n* are printed. Where this is possible, processor 34 is adapted print subsequent images from the print order and to also print the color patches of the first set of color patches as is described above generally with reference to steps 82, 84 and 86.

Similarly, where this is not possible, processor 34 causes subsequent images from the print order to be printed and further causes the color patches of a second color patch set to be printed in print adjacent areas, in a manner that is described above generally with reference to steps 83, 85 and 87.

The printed color patches 104*a*-104*n* and color sensing system 60 are then positioned for sensing (step 88) and the color and intensity of the color patches are sensed (step 90). These are then compared against color informality used in printing the color patches, and any differences are used for recalibration (steps 92 and 94) and recalibrated printer settings are then stored (step 96).

In any embodiment wherein a calibration verification patch 106 is printed, processor 34 can further base the selection of a color patch set upon the sensed color of the calibration verification patch 106. For example, where processor 34 determines that a calibration verification patch has a color error of a particular type, then processor 34 can select a color patch set that can best help to recalibrate printer settings that impact the inappropriate color.

Dynamic Adjustment of Print Adjacent Areas

Figure 10A:
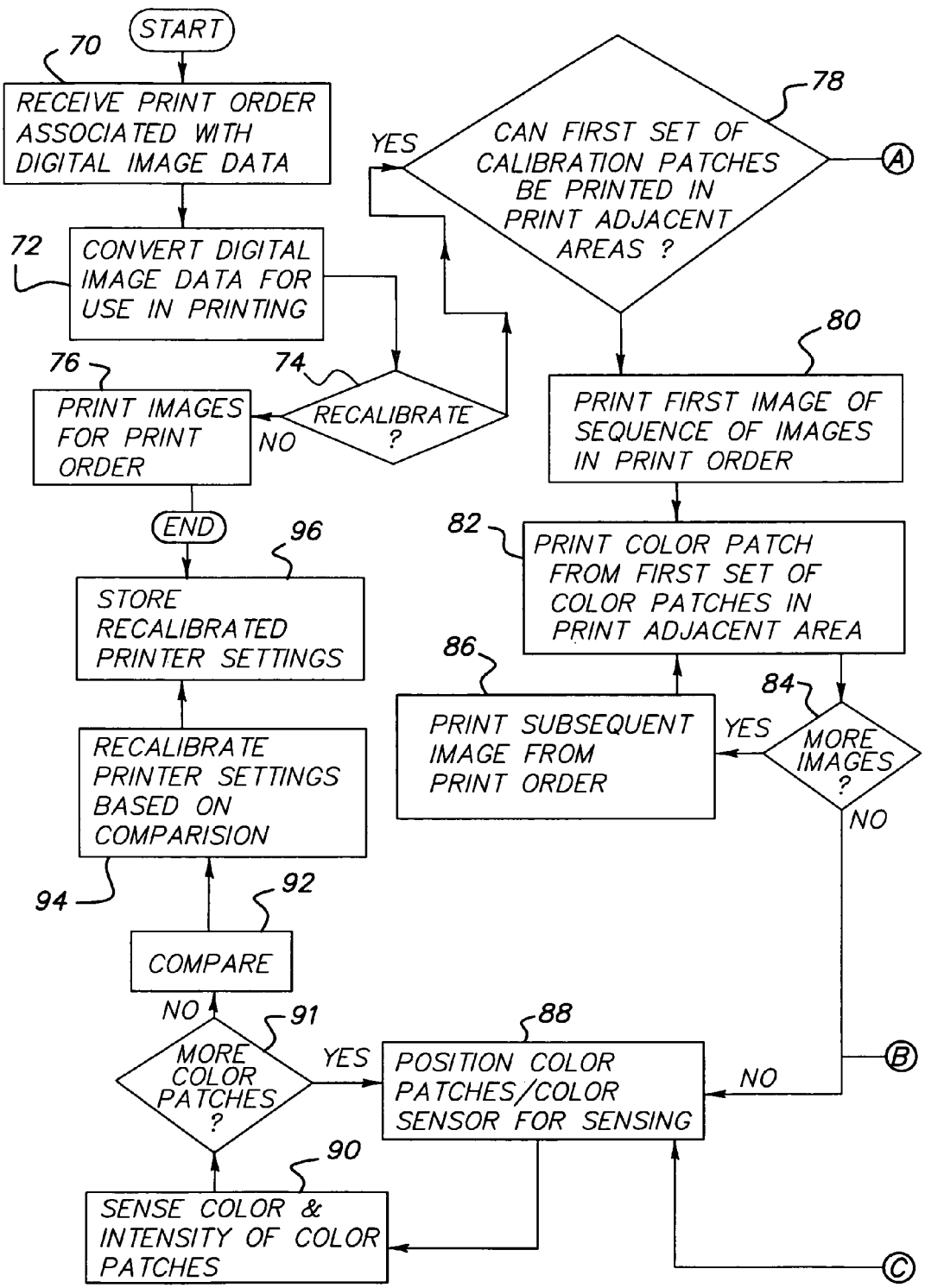
FIG. 10 shows one example embodiment of a printer that is adapted to print using an extended print adjacent area.
Figures 10, 10B:
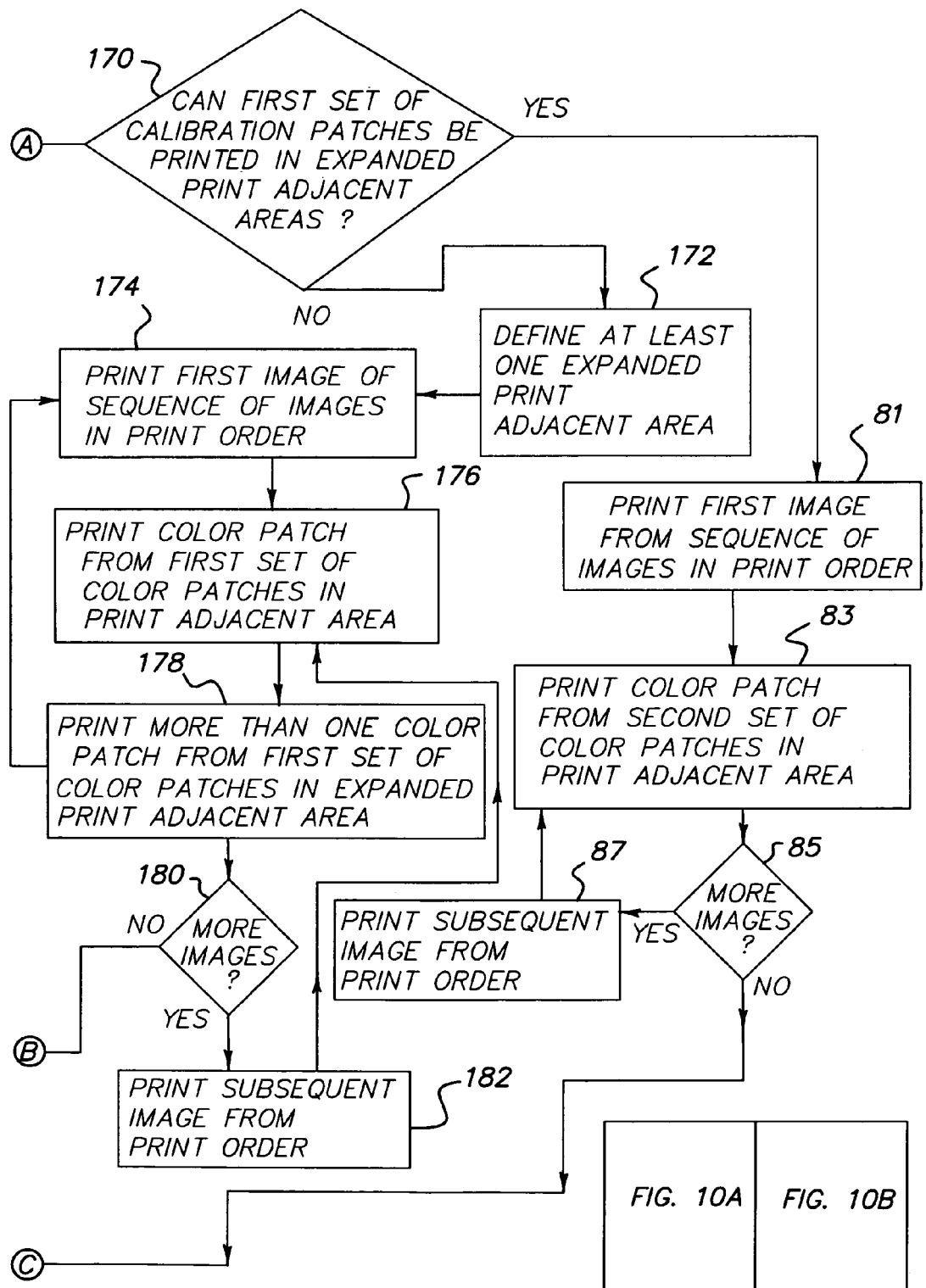
Figure 11:
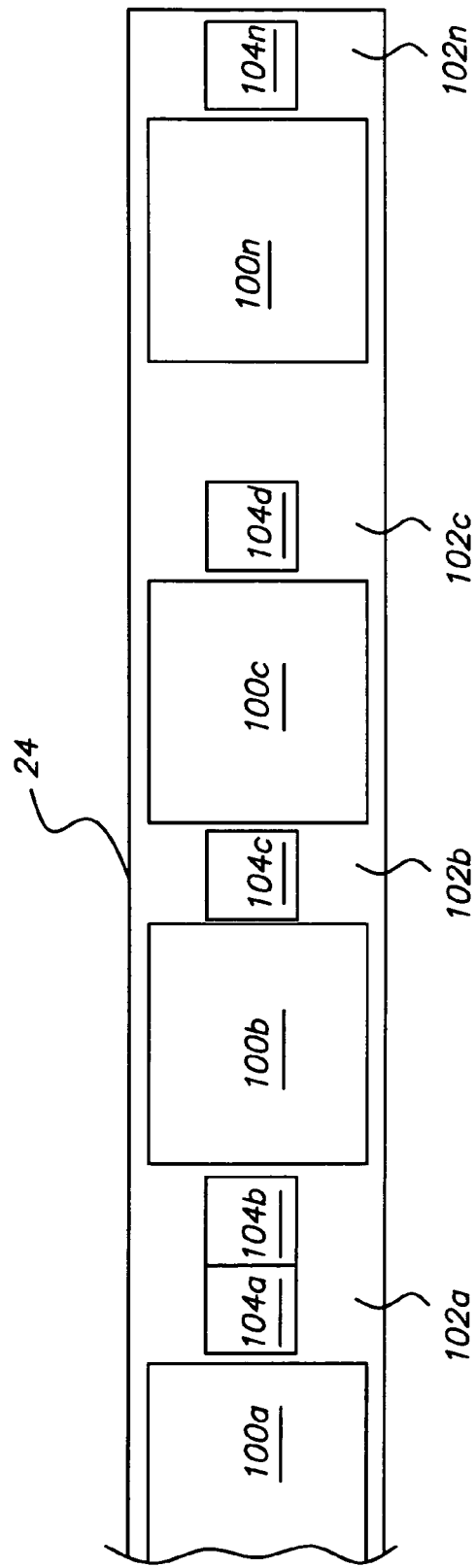
FIG. 11 shows a receiver medium with a color patch set printed using an extended print adjacent area.

In FIGS. 10 and 11 what is illustrated is one embodiment, wherein processor 34 is adapted to provide one or more print adjacent areas having an area of printing that can be increased. This can be used to effectively increase the number of color patches that can be printed during printing of the images 100a-100n of the print order such that a larger color patch set can be printed to reduce the amount of interpolation that printer 20 and processor 34 must do or to provide more comprehensive distribution of sampled color patches during calibration.

As can be seen in FIGS. 10 and 11, the embodiment is similar to that of FIG. 3 with an additional step performed when it is determined that a first color patch set cannot be printed in the print adjacent areas 102a-102n on receiver medium 20. In this new step, processor 34 determines whether one or more of the print adjacent areas can be physically expanded to allow printing of all of the color patches of the first color patch set (step 170) during the printing of the set of images. For example, in certain embodiments, processor 34 can determine that this can be done when the number of print adjacent areas is below a first range but is proximate thereto, such as, where the number of print adjacent areas is within a range of 5% to 50% of the low end of the first range, or a range of 10% to 75% of the low end of the first range. In other example embodiments where a separation exists between the low end of the first range and the high end of the second range, processor 34 can determine to use expanded print adjacent areas when the number of print adjacent areas is within the separation.

Where it is possible to print each of the first set of color patches in the print adjacent areas as expanded, processor 34 provides at least one of the print adjacent areas 102a-102n with an expanded size so that at least one of the print adjacent areas is expanded to hold more than one color patch (step 172) and with more than one color patch being printed in the expanded print adjacent area (steps 176 & 178) while the images are being printed (steps 180 and 182). This allows additional color patches to be printed within the expanded print adjacent areas (steps 174, 176, 178, and 180). Specifically, as illustrated in FIG. 1, print adjacent area 102a has been expanded to allow two color patches, patch 104a and patch 104b to be printed therein. Where it is not possible to print each of the first set of color patches, the color patches of the second color patch set are used (steps 81, 83, 85, 87).

The invention has been described in detail with particular reference to certain preferred embodiments thereof, but it will be understood that variations and modifications can be effected within the spirit and scope of the invention.

PARTS LIST 20 printer
21 housing
22 print engine
24 receiver medium
26 medium advance
28 motor
30 pinch rollers
32 printed image
34 processor
36 user input system
38 sensors
40 memory
42 hard drive
44 removable disk drive
46 memory card slot
48 removable memory
50 memory interface
52 remote memory system
54 communication system
56 remote display device
58 remote user input system
60 color sensing system
62 light source
64 light sensor
65 separation mechanism
66 local display
68 local display user input system
70 receive print order step
72 convert step
74 recalibrate determining step
76 print sequence of images for print order step
78 can first set of calibration patches be printed in print adjacent areas
79 can first set of calibration patches be printed in extended print adjacent areas available in first print order determining step
80 print first image step
81 print first image from sequence of images in print order step
82 print color patch set step
83 print calibration patch from second set of color patches in print adjacent area step
84 more images for printing determining step
85 more images for printing determining step
86 print subsequent images of print order step
87 print subsequent image of images in print order step
88 position color patches/color sensor for sensing step
90 sense color and intensity of color patches step
91 more patches determining step
92 compare step
94 recalibrate printer settings step
96 store recalibrated printer settings step
100a, b, c, n printed images
102a, b, c, n print adjacent areas
104a, b, c, n color patches
130 color aim
132 interpolation
134 code value
136 code value
138 print images step
140 print calibration verification step
142 positioning step
144 sense color step
146 color acceptable determining step
148 set flag step
150 print first image for print order step
152 print calibration verification patch step
154 position for sensing step
156 sense color step
158 sensing of color patch step
156 sense color step
158 color acceptable determining step
160 print remaining images step.
162 can first set of color patches be printed in remaining print adjacent areas determining step
170 can first set of calibration patches be printed in extended print adjacent areas in first print order step
172 define at least one expanded print adjacent area step.

174 print first image for print order step
176 print color patch from first set of color patches step
178 print more than one color patch in expanded print adjacent area step
180 more image for printing determining step
182 print subsequent image from print order step
S color sensing data points

The invention claimed is:

1. A method for operating a printer, the method comprising the steps of:
   receiving a print order associated with image data for use in printing a plurality images;
   converting the image data into actions to print the plurality of images on a receiver medium with print adjacent areas between the printed images, the converting being performed in accordance with printer settings;
   printing a first set of color patches in the print adjacent areas when each of the first set of calibration color patches can be printed in the print adjacent areas;
   printing a second set of color patches in the print adjacent areas when each of the first set of color patches cannot be printed in the print adjacent areas; and,
   sensing the color of each printed color patch and recalibrating the printer settings based upon the sensed colors so that specific colors are printed in response to particular image data;
   wherein there are fewer color patches in the second set of color patches than in the first set of color patches and wherein the first set of color patches and the second set of color patches are printed such that the color patches are in more than one of the print adjacent areas.

2. The method of claim 1, wherein a first algorithm is used to recalibrate the printer settings when the first set of calibration color patches is printed and wherein a second algorithm is used to recalibrate the printer settings when the second set of calibration patches is printed.

3. A method for operating a printer, the method comprising the steps of:
   receiving a print order associated with image data for use in printing a plurality images;
   converting the image data into instructions to print the plurality of images on a receiver medium with a print adjacent area between the printed images, said converting being performed in accordance with printer settings that relate particular image data with printer code values that are used in causing specific colors to be printed;
   determining a number of print adjacent areas that will exist when the images are printed;
   printing the images according to the instructions;
   printing a first set of color patches within the print adjacent areas when the number of print adjacent areas is within a first range;
   printing a second set of color patches within the print adjacent areas when the number of print adjacent areas is within a second range, said second range being lower than the first range; and,
   sensing the color of each printed color patch and determining whether to recalibrate the printer settings based upon the sensed colors so that the particular colors are printed in response to particular image data,
   wherein the set of color patches that is printed in the print adjacent areas is printed such that less than all of the color patches of the printed set are recorded in each print adjacent area and such that all of the color patches of the printed set are printed in the print adjacent areas.

4. The method of claim 3, further comprising the step of expanding the size of at least one of the print adjacent areas when it is determined that the number of print adjacent areas is below the first range, but within a range that is proximate thereto, said additional area being sized to receive additional printed color patches so that the first set of color patches can be printed in the print adjacent areas.

5. A method for operating a printer, the method comprising the steps of:
   receiving a print order associated with image data for use in printing a plurality images;
   converting the image data into instructions to print the plurality of images on a receiver medium with a print adjacent area between the printed images, said converting being performed in accordance with printer settings that relate particular image data with printer code values that are used in causing specific colors to be printed;
   determining a number of print adjacent areas that will exist when the images are printed;
   printing the images according to the instructions, and
   printing a first set of color patches within the print adjacent areas when the number of print adjacent areas is within a first range;
   printing a second set of color patches within the print adjacent areas when the number of print adjacent areas is within a second range, said second range being lower than the first range;
   sensing the color of each printed color patch and determining whether to recalibrate the printer settings based upon the sensed colors so that the particular colors are printed in response to particular image data; printing a calibration verification color patch in one of the print adjacent areas when the number of print adjacent areas is below the second range;
   sensing the color of the calibration verification color patch;
   determining whether to recalibrate the printer settings based upon the sensed color; and
   storing data suggesting that recalibration of the printer settings is to be performed when the sensed color of the calibration verification color patch does not correspond to the code value used to print the calibration verification color patch.

6. A printer comprising:
   a print engine adapted to apply donor material onto a receiver medium;
   a medium transport adapted to position the print engine and receiver medium relative to each other;
   a color light sensor positioned to sense printed colors on the receiver medium; and,
   a processor adapted to receive a print order and to obtain a plurality of images for printing and to cause said print engine and medium transport to cooperate to print the plurality of images on the receiver medium with a print adjacent area between the printed images, said processor further being operable to cause color patches of a selected color patch set to be printed in the print adjacent areas associated with the plurality of printed images such that each print adjacent area contains no more than one of the printed color patches;
   said processor using the color light sensor to sense the colors of the color patches and to determine revised printer settings based upon a comparison of the sensed colors and the colors that the processor instructed the print engine to print in the sensed color patches;

wherein the processor selects the set of color patches from among a plurality of color patch sets based by selecting a first patch set when all of the color patches of the first color patch set can be printed in the print adjacent areas, and selecting a second color patch set when all of the color patches of the first color patch set cannot be printed in the print adjacent areas.

7. A method for operating a printer that prints images in accordance with printer settings, the method comprising the steps of:

receiving a print order associated with image data for use in printing a plurality of images;

printing the plurality of images on the receiver medium with print adjacent areas between the printed images;

printing at least one color patch of a set of calibration color patches in each print adjacent area, such that each of the colors in the calibration color patch set are printed as the images are printed, with each color patch being of one color and having a size that allows a color sensing system to determine the color of the patch;

wherein the receiver medium is moved along a printing path for printing and the different color patches are aligned with each other along the printing path; and wherein movement of the receiver medium along the printing path brings all of the printed color patches of the color patch set past the color light sensor without requiring movement of the receiver medium or color light sensor relative to each other along another path.

8. The method of claim 7, further comprising the steps of sensing a color of the color patch and comparing the sensed color to stored information reflecting the color that the printer was instructed to print in sensed color patch to verify that the printer is calibrated for printing.

9. The method of claim 8, wherein the step of printing at least one color patch of a set of calibration color patches in each print adjacent area further comprises the steps of printing at least one of a first set of color patches and a second set of color patches in the print adjacent areas.

10. The method of claim 9, wherein a selection between the first and second set of color patches is made based upon the number of print adjacent areas that will be formed when the images are printed and based upon the number of color patches that can be printed in each print adjacent area.

11. A printer comprising:

a print engine adapted to apply donor material across a width of a receiver medium;

a medium transport adapted to advance the receiver medium lengthwise past the print engine and to further advance the receiver medium lengthwise along the first path to a color light sensor that is positioned to sense one color representative of a portion of the width of the receiver medium to which the color light sensor is exposed;

a processor adapted to receive a print order, to obtain a plurality of images for printing and to cause said print engine and medium transport to cooperate to print the plurality of images on the receiver medium with a print adjacent area between the printed images, said processor further being operable to cause color patches of a selected color patch set to be printed in the print adjacent areas associated with the plurality of printed images such that each color donor patch can be positioned for sensing by lengthwise movement of the receiver medium; and, said processor using the color light sensor to sense the color of each color patch positioned for sensing and determining revised printer settings based upon a comparison of the sensed colors and the colors that the processor instructed the print engine to print in the sensed color patches;

wherein the processor selects the set of color patches from among a plurality of color patch sets by selecting a first patch set when all of the color patches of the first color patch set can be printed in the print adjacent areas, and selects a second color patch set when all of the color patches of the first color patch set cannot be printed in the print adjacent areas.

12. The printer of claim 11, wherein the processor further selects the set of printed color patches from a plurality of sets of printed color patches based upon the number of print adjacent areas remaining between the then unprinted images of the print order.

13. The printer of claim 11, wherein the processor further stores data in a memory of the printer indicating that a recalibration process should be performed, so that during a later printing process the processor can cause a selected set of color patches to be printed in the print adjacent areas and used for recalibrating the printer settings.

14. The printer of claim 11, wherein the processor further determines the selected set of color patches based upon the sensed color of the calibration verification color patch.

* * * * *